No. 769,412.

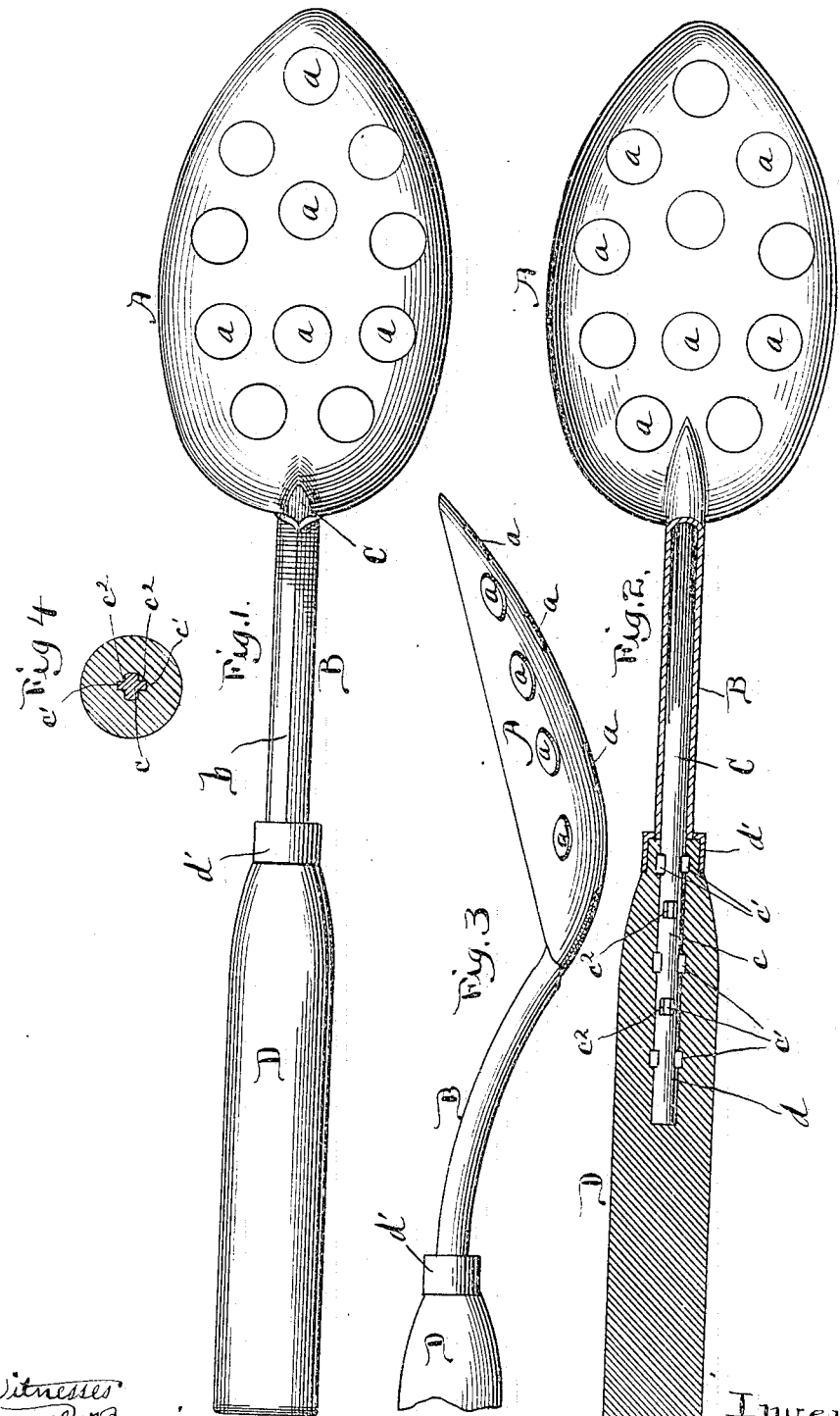

Patented September 6, 1904.

UNITED STATES PATENT OFFICE.

HENRY T. SIDWAY, OF CHICAGO, ILLINOIS.

MIXING-SPOON.

SPECIFICATION forming part of Letters Patent No. 769,412, dated September 6, 1904.

Application filed September 29, 1902. Serial No. 125,263. (No model.)

*To all whom it may concern:*

Be it known that I, HENRY T. SIDWAY, a citizen of the United States, residing at Chicago, in the county of Cook and State of Illinois, have invented a certain new and useful Improvement in Mixing-Spoons, of which the following is a specification.

This invention relates more particularly to the construction of the shank of spoons and ladles, but is applicable also to other like kitchen utensils, and has for its objects to furnish a simple, efficient, and reliable reinforcement for the bowl, shank, and handle that will resist and withstand pressure in the use of the spoon and ladle, to insure a tight, firm, and non-turnable connection between the shank and the handle, and to simplify and improve the bowl, shank, and handle in their relation and connection one to the other and at the same time increase the strength and durability of the spoon, ladle, or other household article.

The invention consists in the features of construction and combination of parts hereinafter described and claimed.

In the drawings, Figure 1 is a bottom view of a beater or mixing-spoon; Fig. 2, a face view of the same with the handle and socket in section; Fig. 3, a side elevation with the handle broken off, and Fig. 4 a cross-section through the handle and shank.

As illustrated and hereinafter described, the invention in the present instance is applied to a spoon or ladle; but it is obvious that it may be applied to other household articles of a similar nature. As shown, A represents the bowl of the spoon, which is provided with a series of holes or openings $a$ for the purpose of allowing material to be strained therethrough, from one end of which extends a sleeve B, preferably of the same material from which the body of the spoon is composed, which sleeve is formed by bending the material of which it is formed to form a tube having the two edges of material brought together on the under side to form a seam $b$, although this seam may be obviated by brazing, soldering, or other process. As shown, this sleeve springs from the body of the spoon at a considerable angle, as is usual in the formation of a spoon, and is afterward curved or bent downwardly to allow to handle to lie in a plane approximate to the body of the spoon.

Within the sleeve is a shank C, preferably composed of a solid rod or bar of sufficient rigidity to impart strength to the spoon, and this shank is bent or curved to conform to the curvature of the sleeve within which it is tightly held. The shank is of a sufficient length to project beyond the sleeve and form an extension $c$, which is provided with a series of ears or lugs $c'$, stamped or otherwise formed in the body of the shank, leaving recesses or depressions $c^2$ contiguous thereto, and the latter is driven into the hole $d$ in a handle D, which hole is of approximately the same diameter as the body of the shank, but of a less diameter than the projection of the ears or lugs, causing the latter to be forced through the wood composing the handle, which closes around the lugs or ears and holds the shank firmly in place. The shank is driven into the handle sufficiently to cause the end of the sleeve to contact with the handle and form a shoulder, which prevents the further insertion of the shank into the wood and serves to reinforce the entire structure, which reinforcement is further effected by means of a ferrule $d'$, which encircles the hole in the end of the handle.

It will thus be seen that utensils embodying the invention herein described will be simple to manufacture and strong and durable in use, the method of reinforcement being one which may be applied to handles of widely different shape, the shank being held rigidly within and by the integral sleeve of the bowl, and being also held against displacement or rotation within the handle by means of the lugs and contiguous depressions formed in the shank, making, in effect, an integral whole of the several parts, with the result of greater strength and rigidity than if the parts were in one continuous piece, as the sleeve and shank support each other and the sleeve, shank, and handle assist each other in adding strength to the united parts.

What I regard as new, and desire to secure by Letters Patent, is—

1. In a mixing-spoon, the combination of a sleeve extending from and integral with the base end of the spoon-bowl and formed into a tubular shape with its longitudinal edges abutting and closed together their full length making a continuous circle in cross-section, a shank inclosed by and fixedly secured in the sleeve and extending beyond the end of the sleeve, the sleeve and shank each supporting and strengthening the other and stiffening the connection between the bowl and the handle, and a handle in which is entered and firmly secured the extension of the shank with the end of the handle abutting against the end of the sleeve, substantially as described.

2. In a mixing-spoon, the combination of a sleeve upwardly curved and extending from and integral with the base end of the spoon-bowl and formed with its longitudinal edges abutting and closed together their full length making a continuous circle in cross-section, a shank inclosed by and fixedly secured in the sleeve and extending in a straight line and having on its exterior rows of lugs arranged in staggered relation, the sleeve and shank each supporting and strengthening the other and stiffening the connection between the bowl and the handle and a handle in which is entered the extended portion of the shank for the lugs to engage the material of the handle and firmly secure the shank within the handle, with the end of the handle abutting against the end of the sleeve, substantially as described.

HENRY T. SIDWAY.

Witnesses:
THOMAS A. BANNING,
OSCAR W. BOND.